May 3, 1966 P. J. BILY 3,249,121
FLUID CONVEYING APPARATUS
Filed April 10, 1963 6 Sheets-Sheet 1
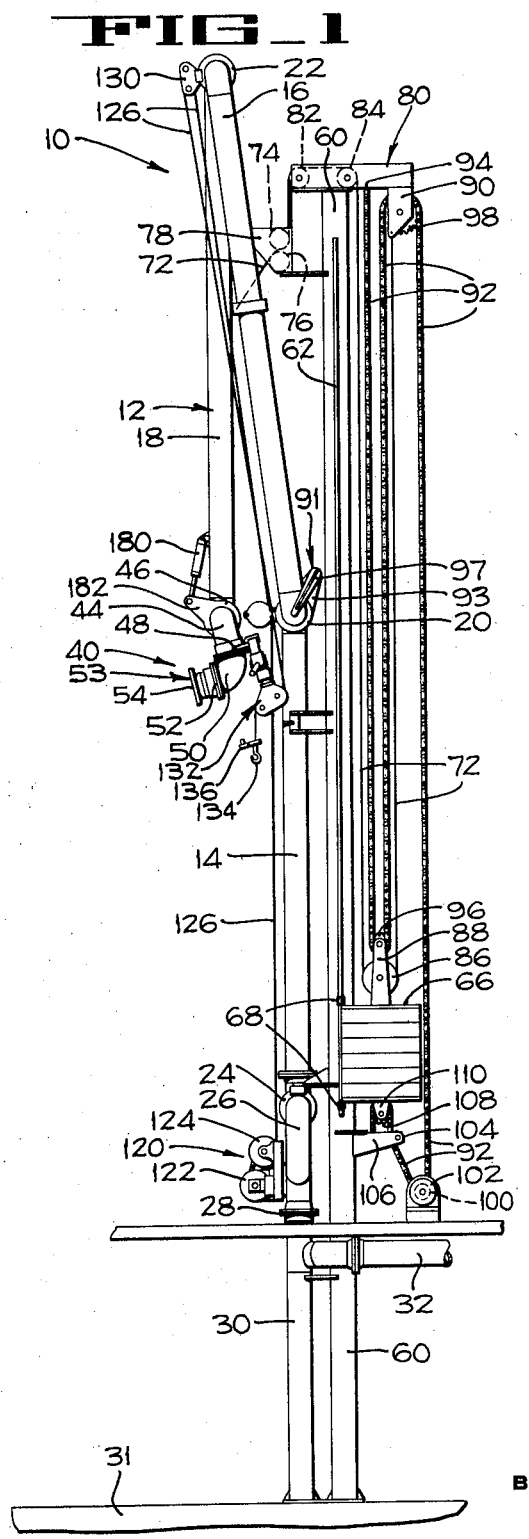
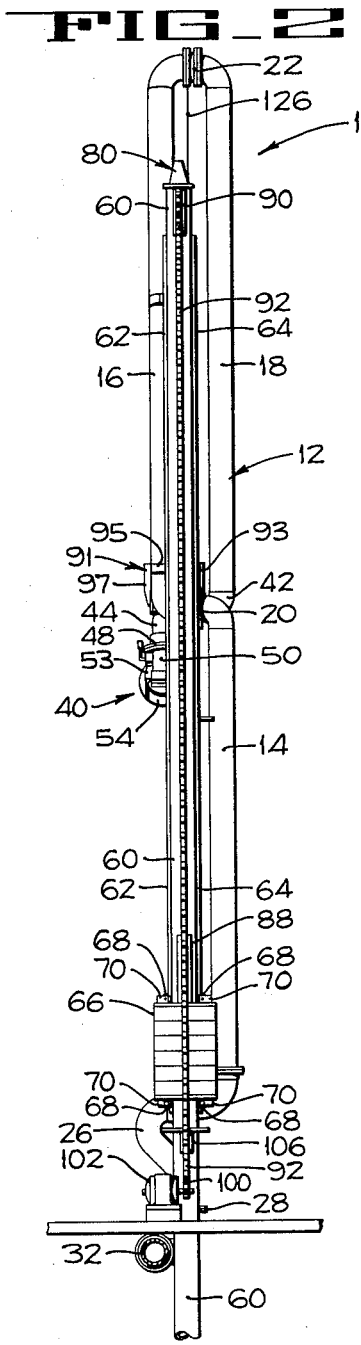
INVENTOR
PETER J. BILY
BY *Hans G. Hoffmeister*
ATTORNEY

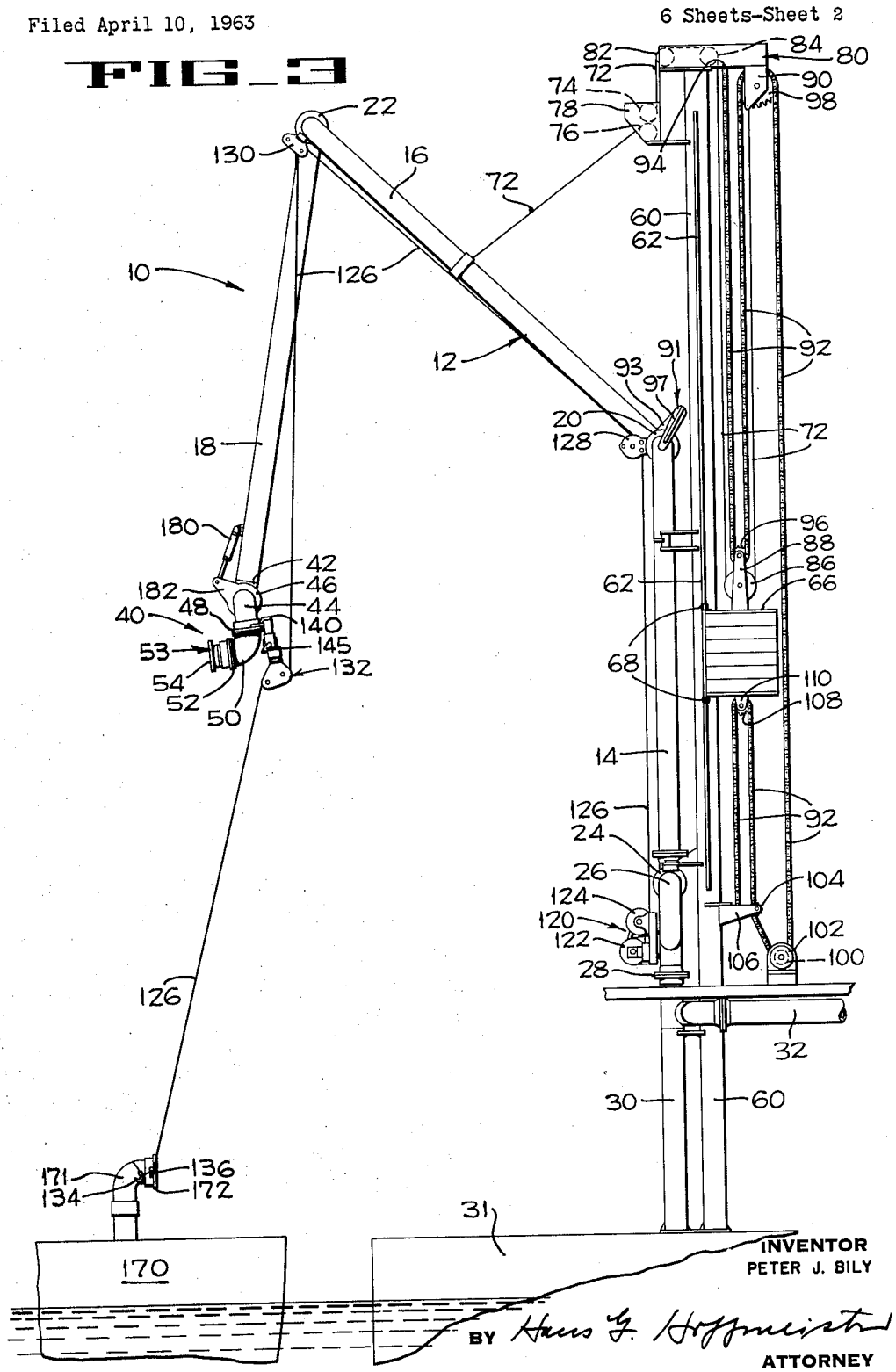

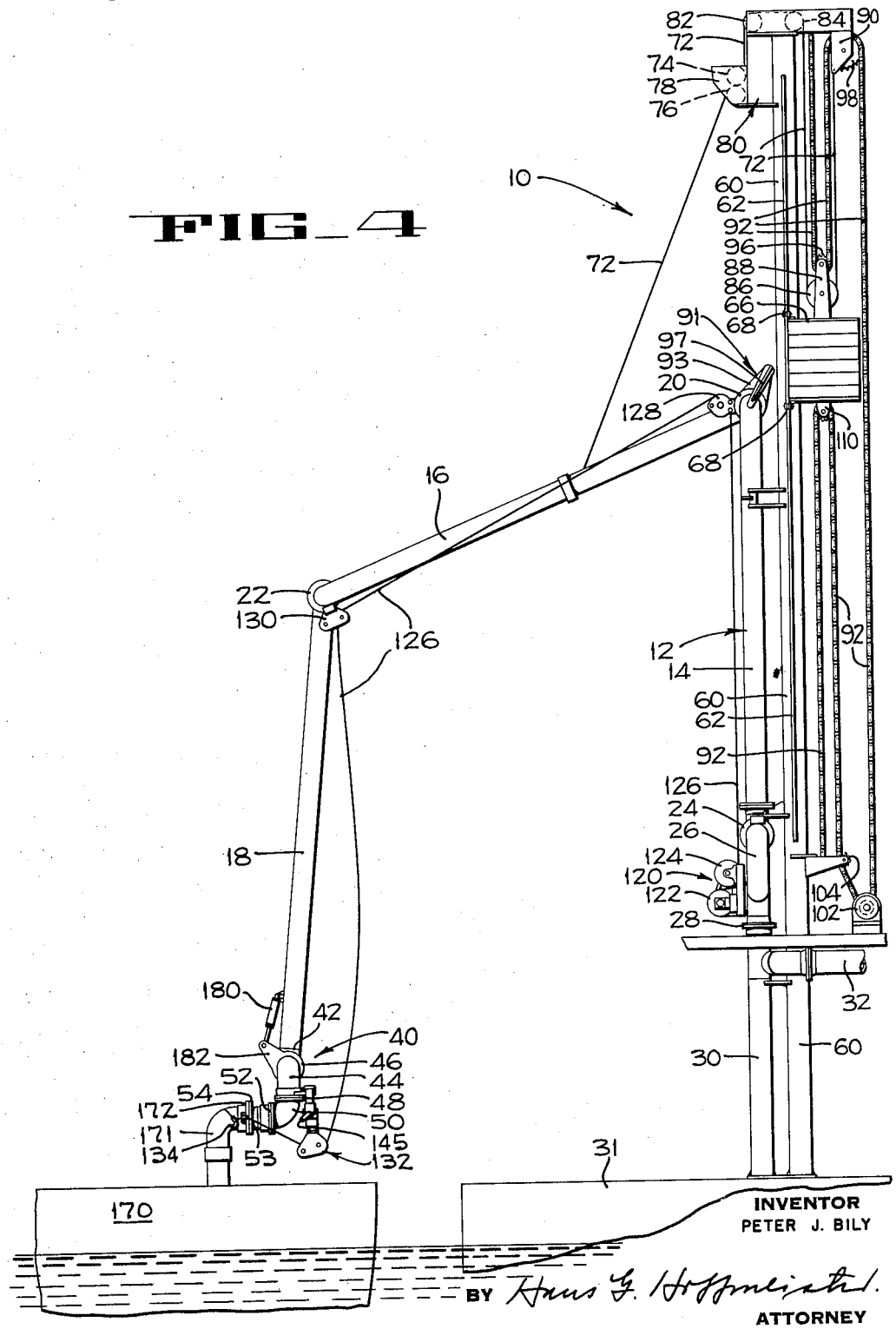

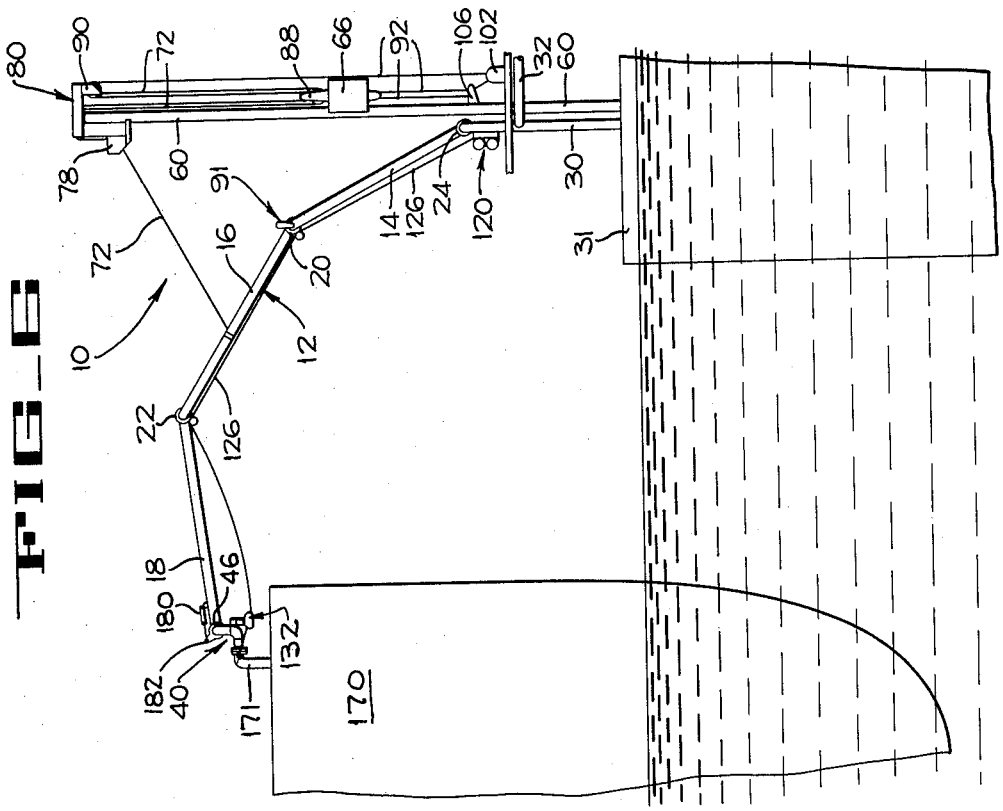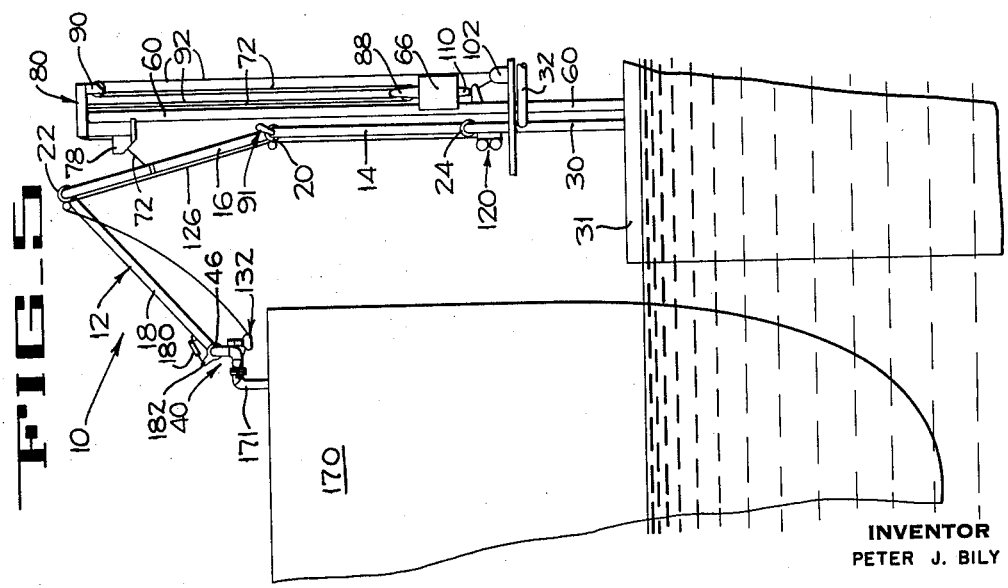

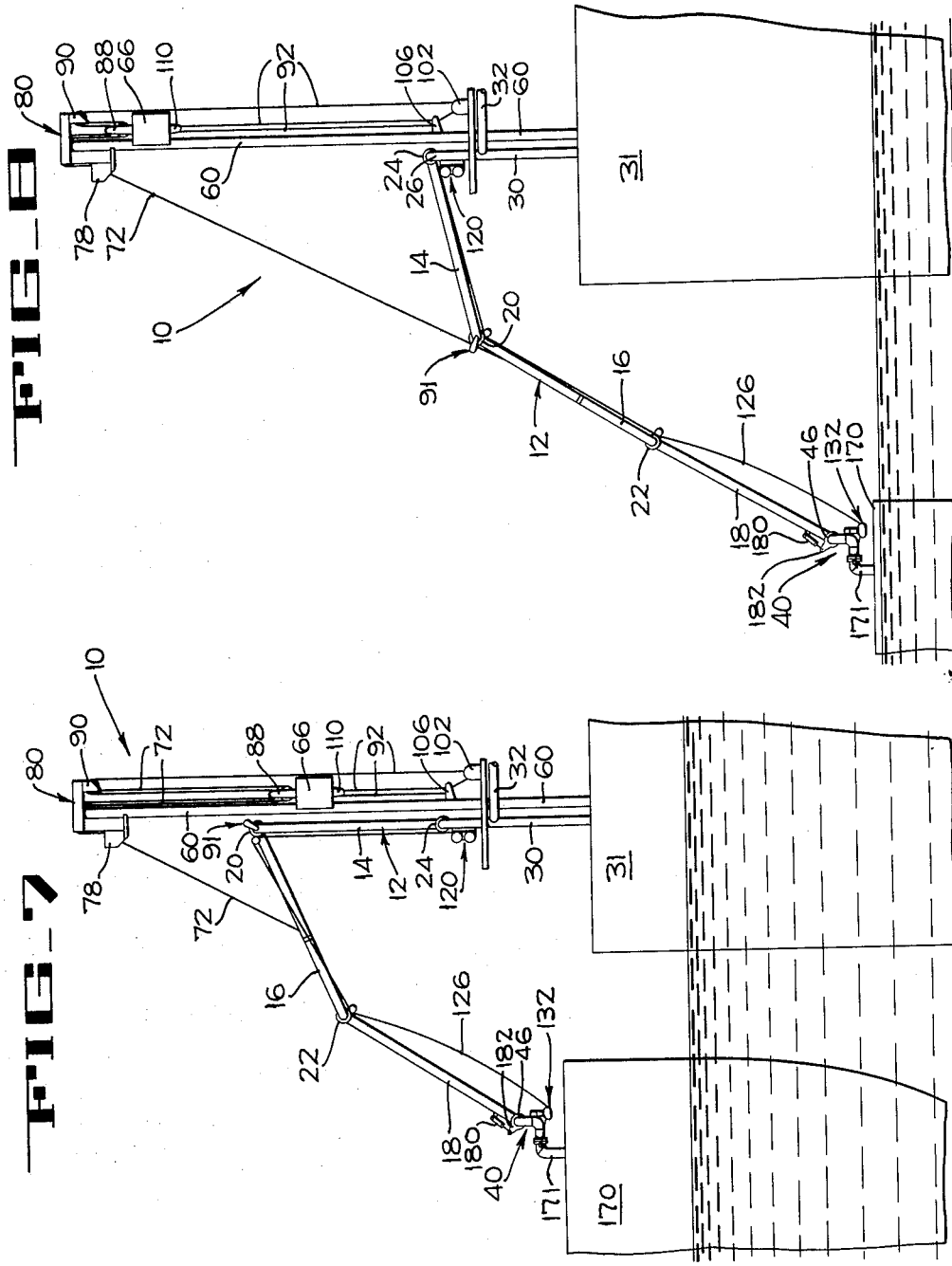

United States Patent Office 3,249,121
Patented May 3, 1966

3,249,121
FLUID CONVEYING APPARATUS
Peter J. Bily, Sunset Beach, Calif., assignor to FMC Corporation, San Jose, Calif., a corporation of Delaware
Filed Apr. 10, 1963, Ser. No. 272,056
18 Claims. (Cl. 137—615)

The present invention pertains to an apparatus for coupling spaced fluid containers with an articulated conduit, such as a marine loading arm, having one end portion mounted adjacent and connected to one of the containers and, more particularly to an apparatus for guiding the opposite end portion of the conduit toward and away from a coupling position adjacent to the other container and for permitting relative elevational and lateral movement between said containers while maintaining the connections of the conduit to said containers.

Movement such as that which is apt to be experienced by a floating ship during loading and unloading requires that apparatus connecting the ship to its wharf be flexible. In the past, it was common practice to employ flexible rubber hoses for loading and unloading tankers. However, such hoses are necessary of large diameter in order to handle fluids and particularly viscous fluids such as crude oil, at a sufficiently high flow rate to be commercially feasible. Furthermore, these hoses must have thick walls in order to resist the high pressures at which such fluids are ordinarily pumped. Therefore, these flexible marine tanker loading hoses are inherently unwieldly and require considerable manhandling to manipulate them while being connected and disconnected. In addition, considerable equipment is required to support the hose while the hose is being moved to and from operating position and while loading or unloading is in progress.

It is, therefore, an object of the present invention to provide an apparatus for coupling spaced fluid containers, such as on a ship and on a wharf, with an articulated conduit of rigid sections so as to permit relative lateral and elevational movement between the containers.

Another object is to provide a coupling apparatus which facilitates control of the outer free end of an articulated conduit, such as a marine loading arm, in guiding it into a position for coupling to a fluid container, such as a tanker.

Another object of the invention is to provide an improved apparatus for establishing fluid communication between a stationary and a movable fluid container.

Another object is to provide a conduit including a plurality of relatively inflexible sections which are pivotally interconnected and supported in a manner enabling the conduit to readily accommodate itself to the movements of a floating ship with respect to a wharf while fluid in being transported by the conduit between the wharf and the ship.

Another object is to provide an articulated conduit made up of swivelly interconnected sections including counter-balancing means for supporting the weight of the sections and power means for manipulating the conduit sections to and from their operative postions wherein the conduit can be connected with a ship.

These and other objects and advantages of the present invention will become apparent from the following description and the accompanying drawings, in which:

FIG. 1 is a side elevation of the fluid conveying apparatus embodying the present invention.

FIG. 2 is a rear elevation of the fluid conveying apparatus illustrated in FIG. 1.

FIG. 3 is also a side elevation of the apparatus but shows the same partially extended toward the ship to which it is to be attached.

FIG. 4 is a side elevation similar to FIG. 3 illustrating the apparatus connected to a ship manifold.

FIGS. 5, 6, 7 and 8 are schematic side elevations illustrating the apparatus of the present invention attached to the fluid manifold on a ship, or barge, adjacent a wharf, with the ship being shown in various positions relative to the wharf surface.

Figure 9:
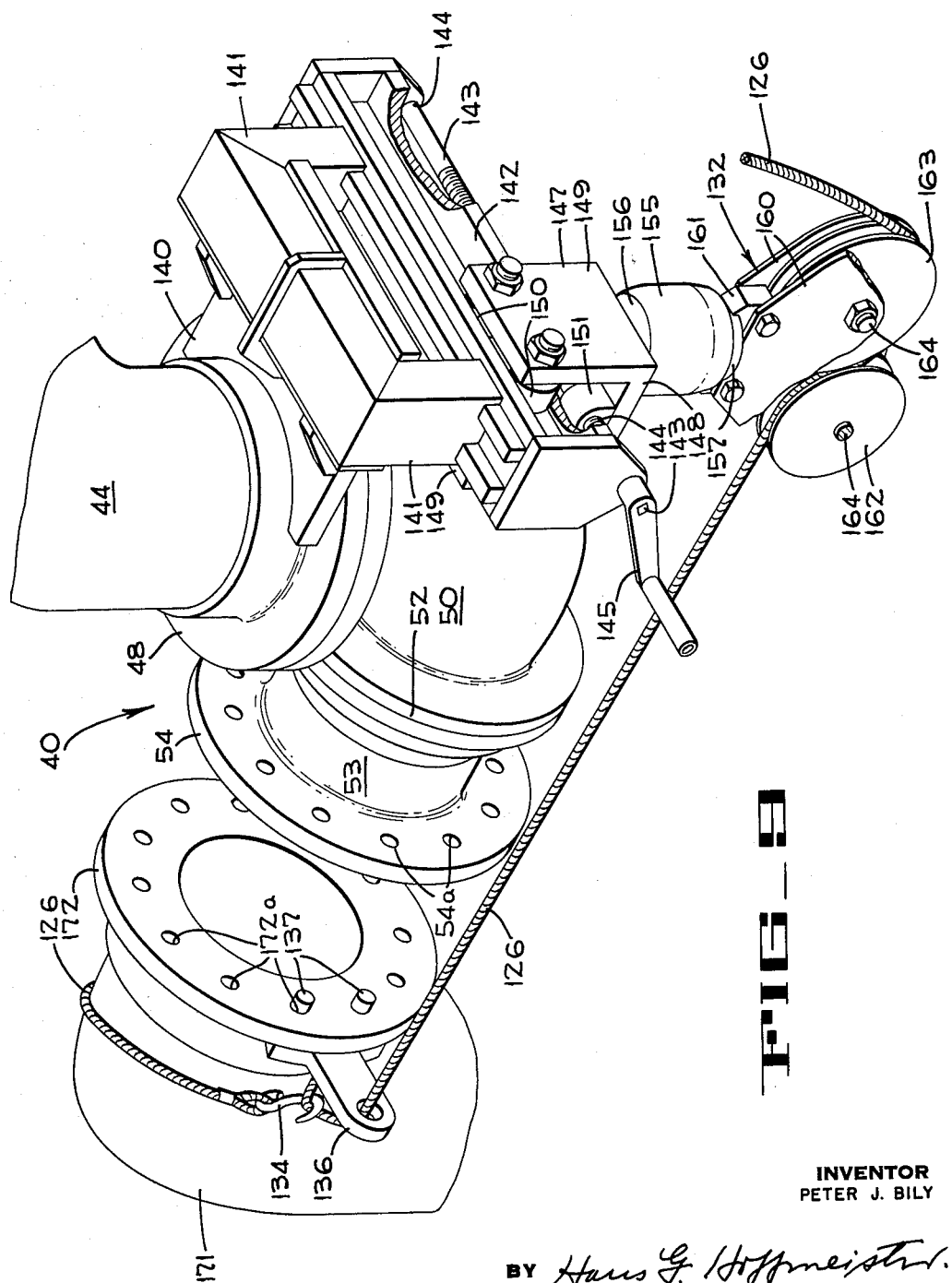
FIG. 9 is an isometric of an outer end portion of the fluid conveying apparatus and of a portion of a ship manifold and shows the position of the apparatus just before its connection to the manifold.

The coupling apparatus 10 of the present invention comprises an articulated conduit 12 including, in the disclosed embodiment, three rigid sections 14, 16 and 18 swivelly interconnected by swivel joints 20 and 22 for swinging movement relative to each other in a vertical plane.

The innermost section 14 is connected by a swivel joint 24 for movement in a vertical plane relative to an elbow unit 26. The elbow unit 26 is connected by a swivel joint 28 to a vertical stand pipe 30 to permit rotation of the conduit 12 about the vertical axis of the stand pipe 30 thereof. The stand pipe 30 is fixed to the wharf 31 and extends vertically upwardly therefrom. A fixed wharf conduit 32 from a source of supply of a fluid container or receptacle (not shown) is connected to the stand pipe 30.

The outer or free end of the outer conduit section 18 is connected to a coupling unit indicated generally by the numeral 40. The coupling unit 40 comprises an elbow 42 (FIG. 2) fixed to the conduit section 18 and connected to a second elbow 44 (FIG. 1) by a swivel joint 46. The elbow 44 is connected by a second swivel joint 48 to another elbow 50. The elbow 50 is connected by a third swivel joint 52 to a coupling 53 including a flange 54 having holes 54a (FIG. 9) therein.

A supporting mast 60 (FIG. 1) is fixed to the wharf 31 and extends vertically upwardly therefrom parallel to the vertical stand pipe 30 and adjacent thereto. Suitable guy wires (not shown) are fixed to the upper end of the mast 60, extend diagonally downwardly therefrom, and are fixed to the wharf to support the mast in its upright position.

The mast 60 is provided with guide tracks 62 and 64 on its opposite sides. A counterweight 66 is slidably mounted on the mast and is provided with grooved rollers 68 rotatably mounted on suitable brackets 70 fixed to the counterweight 66. The rollers 68 engage the tracks 62 and 64 to guide the counterweight 66 for movement upwardly and downwardly adjacent the mast 60. A cable 72 is fixed to the center section 16 of the conduit 12 adjacent the mid-point thereof and extends upwardly therefrom between two sheaves 74 and 76 rotatably mounted on a bracket 78 fixed to a cap assembly 80 mounted on the upper end of the mast 60. The cable 72 then passes over two sheaves 82 and 84 rotatably mounted on the upper portion of the cap assembly 80. The cable 72 then passes downwardly adjacent the rear portion of the mast 60 and around a sheave 86 rotatably mounted in a bracket 88 fixed to the upper end of the counterweight 66. The cable 72 then passes upwardly and is dead-ended on a bracket 90 fixed to the cap assembly 80. Thus it can be seen that when the counterweight 66 moves upwardly the conduit 12 is permitted to swing outwardly from the mast 60, as illustrated in FIG. 3, and conversely, when the counterweight 66 moves downwardly under the influence of gravity, it will bring the conduit 12 back to its rest position, as illustrated in FIG. 1. The counterweight 66 is overweighted so that whenever there is no power applied thereto, and when the flanged coupling 53 is not connected to a ship, the conduit always returns to its rest position illustrated in FIG. 1.

Since the cable 72 is connected to the center section 16 of the conduit 12, a motion limiting mechanism 91 is associated with the swivel joint 20 to prevent jackknifing of the sections 14 and 16 when the conduit 12 is extended in the manner illustrated in FIG. 6. The motion limiting mechanism 91 (FIG. 1) comprises a bracket 93 fixed to the portion of the swivel joint 20 which is rigid with the conduit section 14. A crossbar 95 (FIG. 2) is fixed to the outer end of the bracket 93 and extends transversely therefrom across the path of movement of the section 16 of the conduit 12. The opposite end of the crossbar 95 is provided with a support arm 97 which is pivotally attached to the movable element of the swivel joint 20 at the axis of rotation thereof. The motion limiting mechanism 91 prevents clockwise rotation of conduit section 16 relative to section 14 beyond the point where section 16 contacts the crossbar 95.

Power means are provided for moving the counterweight 66 relative to the mast 60. Said power means comprises a chain 92 (FIG. 1) dead-ended at one end 94 to the cap assembly 80. The chain 92 passes downwardly adjacent the rear of the mast 60 and around a sprocket 96 rotatably mounted on the bracket 88 fixed to the upper end of the counterweight 66. The chain 92 then passes upwardly and around a sprocket 98 rotatably mounted on the bracket 90 fixed to the previously mentioned cap assembly 80. The chain 92 then passes downwardly behind the counterweight 66 and is trained around a sprocket 100 affixed to the driveshaft of a reversible hydraulic motor 102. The chain 92 passes upwardly behind an idler sprocket 104 rotatably mounted on a bracket 106 fixed to the rear of the mast 60 and over a sprocket 108 rotatably mounted on a bracket 110 fixed to the underside of the counterweight 66. The end of the chain 92 then passes downwardly and is dead-ended on the bracket 106. Thus it may be seen that when the hydraulic motor 102 is actuated, the counterweight 66 is moved either upwardly or downwardly depending on the direction of rotation of the driveshaft of the motor 102.

A winch assembly 120 (FIG. 3) is mounted on the elbow 26 and comprises a reversible hydraulic drive motor 122 which drives a winch drum 124. A wire line 126 extends from the drum 124 parallel to the conduit section 14 and through a block 128 fixed to the swivel joint 20 between the conduit sections 14 and 16. The wire line 126 continues parallel to the conduit section 16 and between two opposed sheaves in a block 130 fixed to the swivel joint 22 between the conduit sections 16 and 18. The line 126 continues downwardly adjacent to the conduit section 18 and passes through an adjustable block 132 mounted on the coupling unit 40. The end of the wire line 126 is provided with a hook 134, and a flange bracket 136 is slidably connected to the line and has a pair of spaced positioning pins 137 thereon.

In order to mount the adjustable block 132 on the coupling unit 40 (FIG. 9), a support bracket 140 is rigidly connected to the second elbow 44. This support bracket has pendent flanges 141 extending downward at the rear of the elbow 50. A generally horizontal track 142 has opposite ends rigidly connected to the pendent flanges and extends therebetween. A lead screw 143 has opposite ends 144 journalled in the pendent flanges 141 and extends therebetween under the track. A crank handle 145 is connected to one end of the lead screw, outward of the adjacent flange 141, for imparting rotation to the screw. A carriage 147 includes a bottom flange 148 under the lead screw 143 and side flanges 149 extending upward from the bottom flange on opposite sides of the track 142. Rollers 150 are rotatably mounted on the side flanges and extend inward therefrom over and in engagement with the track. In this manner, the carriage is mounted for guided movement between the pendent flanges on the track. A nut 151 is secured to the bottom flange of the carriage and has an internally threaded bore receiving the lead screw so that when the handle rotates the lead screw, the lead screw moves the carriage along the track.

A swivel joint 155 has an upper portion 156 secured to the lower surface of the bottom flange 148 of the carriage 147 and a lower portion 157 swivelly connected to the upper portion. The adjustable block 132 includes spaced side plates 160, a top portion 161 bolted between the side plates and also secured to the lower portion of the swivel joint, and front and rear sheaves 162 and 163 journalled on axles 164 between the side plates. The wire line 126 passes under the rear sheave 163 and over the front sheave 162.

In operation of the subject apparatus, a heaving line, not shown, is first thrown from the wharf 31 (FIG. 3) to the ship 170, and the wharf end of the heaving line is then attached to the hook 134 of the wire line 126. A member of the crew on the ship then pulls the heaving line so as to draw the wire line 126 over to the ship. The end of the wire line is looped around the ship's manifold 171 behind the flange 172 thereon and is fastened by hook 134 (FIG. 9) in this position. Furthermore, the pins 137 of the flange bracket 136 are inserted through a pair of adjacent holes 172a in the ship's flange 172 at one side of the flange 172 so that bracket 136 engages the back surface of the flange.

The next task is to lower the coupling flange 54 of the coupling unit 40 until this flange is generally opposite to the ship's flange 172. The winch and counterweight motors 122 and 103 coact in performing this task. Thus, the counterweight motor is operated so as to pay out the cable 72, thereby lowering the flange 54. The horizontal position of the flange 54 is controlled by the winch motor which is operated to tension the line 126 and thereby guide the flange 54 along a declined path (FIG. 3) toward the ship's flange 172 as the coupling flange is lowered. While the coupling flange is still above the ship's flange, the line 126 is slacked off so that as the cable continues to pay out, the coupling flange descends along a generally vertical path into a preliminary position, not shown, wherein it is slightly below the ship's flange and on the side thereof toward the wharf 31.

In this preliminary position, the coupling flange 54 may be to the left or to the right of the ship's flange 172, or in between such left and right positions. In other words the coupling flange may be displaced laterally with respect to the ship's flange, or it may be generally aligned with, although slightly below, the ship's flange. As will be understood, the lateral position of the coupling flange depends on the relationship of the block 132 on the coupling unit 40 to the bracket 136 on the ship's flange, and this relationship is controlled by the wire line. That is, when the wire line was tensioned by the winch motor 122, the sheaves 162 and 163 of the block 132 were forced into a vertical plane that extends through the bracket 136 and the blocks 128 and 130. If the block happens to be at the extreme right end of the track 142 (it is shown at the extreme left end in FIG. 9) as the coupling flange is lowered, then said preliminary position of the coupling flange will be to the left of the ship's flange. Assuming such leftward displacement, one of the crew turns the handle 145 in order to move the carriage 147, and thus the block 132, to the extreme left, the position illustrated in FIG. 9. A hydraulic ram 180, connected between the conduit section 18 and a bracket 182 fixed to the swivel joint 46, is actuated to swing the coupling unit about its horizontal axis thereby to move the coupling flange 54 into a vertical plane parallel to the ship's flange.

The winch motor 122 is again operated to tension the wire line 126 thereby to force the flange 54 of the coupling unit 40 upwardly and toward the ship's flange 172, eventually causing the coupling flange to mate against the ship's flange with the holes 54a and 172a in registration, the appropriate holes 54a fitting over the pins 137. The counterweight motor 122 is of course available for use if adjustments in the vertical position of the coupling flange are necessary to align the holes 52a with the holes 172a. Also, the carriage can be adjusted to the left or right by the handle 145 if lateral adjustments are needed.

Therefore, by combined operation of the winch and counterweight motors 122 and 104, the ram 180, and the handle 145, the coupling flange 54 is brought into mating engagement with the flange 172 so that these flanges can be bolted together. Instead of a bolted connection, the flanges can be automatically latched together when the coupling flange is brought into proximity to the ship's flange; appropriate latching mechanisms are well known in the art.

Once the two mating flanges 52 and 172 have been connected together, power is removed from the winch motor 122 and from the motor 102 so that the counterweight 66 balances the weight of the conduit 12 extending outwardly to the ship and so that the conduit 12 may move freely with the movements of the ship 170, caused by tides, by drifting of the ship relative to the wharf 31, or by the difference in buoyancy of the ship due to the loading and unloading thereof by the conveying of fluids between the ship and the wharf through the conduit, as illustrated in FIGS. 5–8.

When it is desired to retract the conduit 12, the flange connection between the coupling unit 40 and the manifold 171 is released, and the hook is unfastened from the loop at the end of the wire line 126. Power is applied to the motor 102, and the motor 102 is actuated to lower the counterweight 66 so that the weight of the counterweight withdraws the conduit 12 to its rest position illustrated in FIG. 1.

From the foregoing detailed description it may be noted that one advantage of the mechanism of the present invention is its relative simplicity wherein coupling or interconnecting ships or marine tankers to a wharf for the conveying of fluid therebetween requires the services of only two men to effect the coupling connection, one man on the wharf and the other on the ship.

Another advantage of the present mechanism is that the conduit sections are rigid pipes and are thus not subject to wear by abrasion or chafing, but which will not interfere with free movement of the ship relative to its wharf.

Although a preferred embodiment of the present invention has been disclosed herein, it should be noted that various changes may be made therein without departing from the spirit of the invention nor the scope of the appended claims.

The invention having thus been described, what is claimed and desired to be protected by Letters Patent is:

1. For use with spaced first and second supports, an articulated conduit including a rigid inner section, means for mounting said inner section on said first support for pivotal movement about a substantially horizontal axis, and said articulated conduit including an outer section and means pivotally connecting said outer section to said inner section for movement about an outer axis substantially parallel to said inner axis; an apparatus for positioning the outer section of said conduit adjacent to said second support comprising means for supporting and elevationally moving said inner section; a flexible line having an intermediate portion slidably carried by said conduit, an outer portion, and an inner portion; means for connecting the outer portion of said line to said second support; and means for pulling on the inner portion of said line with respect to its connected outer portion to tension said line and thereby to guide said outer section toward said second support.

2. For use with spaced first and second fluid containers, an articulated conduit including a rigid inner section having an inner end pivotally mounted adjacent to said first container for movement about a substantially horizontal inner axis, a rigid outer section, and means pivotally connecting said outer section to said inner section for movement about an outer axis substantially parallel to said inner axis, said outer section having an outer end; an apparatus for positioning the outer end of said outer section adjacent to said second container comprising means for yieldably supporting said inner section; a flexible line having an intermediate portion slidably connected to said inner section of the conduit and to the outer end of said outer section, said line also having inner and outer end portions connected to said intermediate portion; means for connecting the outer end of said line adjacent to said second container; and means for pulling on the inner end of the line with respect to said connected outer end of the line for sliding said conduit along the line thereby to guide the outer end of the conduit to a coupling position adjacent to said second container.

3. An apparatus for coupling first and second supports each having a fluid container associated therewith comprising an articulated conduit having first and second rigid sections pivotally interconnected at a joint between said sections; means connecting the first conduit section to said first support for pivotal movement along a substantially horizontal axis parallel to the joint axis and with said second section depending from said joint; means yieldably supporting said first section with respect to said horizontal axis; a flexible line having an outer end connected to said second support below said second section, an inner end, and an intermediate portion slidably connected to said first section adjacent to said joint and to said second conduit section in a spaced relation to said joint; and powered means on said first support for pulling on said inner end of the line with respect to pulling on said outer end thereof so as to move said joint and said second conduit section downwardly with respect to said horizontal axis thereby to guide said second section along said flexible line toward said second support.

4. The apparatus of claim 3 wherein said yieldable supporting means includes a counterweight, means mounting said counterweight on said first support for vertical movement, and means including a cable interconnecting said inner conduit section and the counterweight so that said counterweight yieldably opposes downward movement of said inner section.

5. The apparatus of claim 4 including a powered mechanism connected to said counterweight for controllably raising and lowering said counterweight, said powered mechanism being disconnectable from said counterweight to permit free vertical movement of said counterweight independently of said powered mechanism.

6. A fluid conveying apparatus comprising a fluid conveying conduit made up of three rigid sections swivelly interconnected in series for movement relative to each other in a vertical plane, means for swivelly connecting one of the end sections to a fixed conduit for pivotal movement relative thereto, a coupling unit connected to the free end of the other end section for universal movement relative thereto, a counterweight, and a cable connected to said counterweight and to the central conduit section.

7. A fluid conveying apparatus comprising a fluid conveying conduit made up of three rigid sections swivelly interconnected in series for movement relative to each other in a vertical plane, means swivelly connecting one of the end sections to a fixed conduit for pivotal movement relative thereto, a coupling unit connected to the free end of the other end section for universal movement relative thereto, a vertical mast mounted adjacent said fixed conduit, a counterweight mounted for vertical movement adjacent said mast, and a cable connected to said counterweight and to the central conduit section adjacent the midpoint thereof and passing over a sheave mounted adjacent the top of said mast.

8. A fluid conveying apparatus comprising a fluid conveying conduit made up of three rigid sections swivelly interconnected in series for movement relative to each other in a vertical plane, means swivelly connecting one of the end sections to a fixed conduit for pivotal movement relative thereto, a coupling unit connected to the free end of the other end section for universal movement relative thereto, a vertical mast mounted adjacent said fixed conduit, a counterweight mounted for vertical movement adjacent said mast, a cable connected to said counterweight and to the central conduit section adjacent the midpoint thereof and passing over a sheave mounted adjacent the top of said mast, power means for moving said counterweight vertically relative to said mast.

9. A fluid conveying apparatus comprising a fluid conveying conduit made up of three rigid sections swivelly interconnected in series for movement relative to each other in a vertical plane, means swivelly connecting one of the end sections to a fixed conduit for pivotal movement relative thereto, a coupling unit connected to the free end of the other end section for universal movement relative thereto, and a winch having a drum with a line coiled thereon mounted adjacent the innermost end section of said conduit, the line from said winch extending generally parallel to said sections and passing through blocks fixed adjacent the joints between sections and a block adjacent the free end of the outermost section, whereby said winch line may be attached to a ship to guide the free end of said conduit to said ship.

10. A fluid conveying apparatus comprising a fluid conveying conduit made up of three rigid sections swivelly interconnected in series for movement relative to each other in a vertical plane, means swivelly connecting one of the end sections to a fixed conduit for pivotal movement relative thereto, a flanged coupling unit connected to the free end of the other end section for universal movement relative thereto, a counterweight, a cable connected to said counterweight and to the central conduit section, and a winch having a drum with a line coiled thereon mounted adjacent the innermost end section of said conduit, the line from said winch extending generally parallel to said sections and passing through blocks fixed adjacent the points between said sections and a block adjacent the free end of the outermost section, whereby said winch line may be attached to a ship to guide the free end of said conduit to said ship.

11. A fluid conveying apparatus comprising a fluid conveying condiut made up of three rigid sections swivelly interconnected in series for movement relative to each other in a vertical plane, means swivelly connecting one of the end sections to a fixed conduit for pivotal movement relative thereto, a coupling unit connected to the free end of the other end section for universal movement relative thereto, a vertical mast adjacent said fixed conduit, a counterweight mounted for vertical movement adjacent said mast, a cable connected to said counterweight and to the central conduit section adjacent the midpoint thereof and passing over a sheave mounted adjacent the top of said mast, and a winch having a drum with a line coiled thereon mounted adjacent the innermost end section of said conduit, the line from said winch extending generally parallel to said sections and passing through blocks fixed adjacent the joints between sections and a block adjacent the free end of the outermost section, whereby said winch line may be attached to a ship to guide the free end of said conduit to said ship.

12. A fluid conveying apparatus comprising a fluid conveying conduit made up of three rigid sections swivelly interconnected in series for movement relative to each other in a vertical plane, means swivelly connecting one of the end sections to a fixed conduit for pivotal movement relative thereto, a coupling unit connected to the free end of the other end section for universal movement relative thereto, a vertical mast mounted adjacent said fixed conduit, a counterweight mounted for vertical movement adjacent said mast, a cable connected to said counterweight and to the central conduit section adjacent the midpoint thereof and passing over a sheave mounted adjacent the top of said mast, power means for moving said counterweight vertically relative to said mast, and a winch having a drum with a line coiled thereon mounted adjacent the innermost end section of said conduit, the line from said winch extending generally parallel to said sections and passing through blocks fixed adjacent the joints between sections and a block adjacent the free end of the outermost section, whereby said winch line may be attached to a ship to guide the free end of said conduit to said ship as said counterweight is raised.

13. A fluid conveying apparatus comprising a fluid conveying conduit made up of three rigid sections swivelly interconnected in series for movement relative to each other in a vertical plane, means swivelly connecting one of the end sections to a fixed conduit for pivotal movement relative thereto in both vertical and horizontal planes, a coupling unit connected to the free end of the other end section for universal movement relative thereto, a vertical mast mounted adjacent said fixed conduit, a counterweight mounted for vertical movement adjacent said mast, a cable connected to said counterweight and to the central conduit section adjacent the midpoint thereof and passing over a sheave mounted adjacent the top of said mast, power means for moving said counterweight vertically relative to said mast, and a winch having a drum with a line coiled thereon mounted adjacent the innermost end section of said conduit, the line from said winch extending generally parallel to said sections and passing through blocks fixed adjacent the joints between sections and a block adjacent the free end of the outermost section, whereby said winch line may be attached to a ship to guide the free end of said conduit to said ship as said counterweight is raised.

14. The combination of claim 1 wherein said second container includes a manifold having a flange, wherein a coupling unit is connected to the outer section of said conduit and provides a coupling flange, said elevationally moving means and said pulling means being operable to lower said coupling flange from a position above said manifold flange to a position generally confronting said manifold flange, and wherein said apparatus includes means for adjusting said coupling flange into substantially parallel relation with said manifold flange so that tensioning of said line moves said coupling flange toward said manifold flange and into mating engagement therewith.

15. The combination of claim 1 wherein said mounting means mounts said inner section for movement about a vertical axis, said apparatus including a block guidably receiving the outer end of the line, and wherein said apparatus includes means mounting said block on the outer section of said conduit for adjustable movement of the block transversely of said outer section.

16. The combination of claim 1 wherein said second container includes a manifold having a manifold flange, wherein the outer end of said line is looped around said manifold in back of said manifold flange and thereby connected to said manifold, wherein said appartaus includes a coupling unit swivelly connected to the outer end of said outer section, means for adjusting the angularity of said coupling unit with respect to said outer section, a block guidably receiving the outer end of said line, and means mounting said block on the coupling unit for adjustable movement transversely of said outer section.

17. The combination of claim 16 wherein said block mounting means includes a track rigidly connected to said coupling unit and extending transversely of said outer section, a carriage movable lengthwise on said track and supporting said block, a lead screw extending substantially parallel to said track and journalled on said coupling unit, a nut secured to said carriage and threaded on said screw, and a crank handle secured to said lead screw.

18. The combination of claim 17 wherein said block is swivelly connected to said carriage.

References Cited by the Examiner

UNITED STATES PATENTS

| | | | |
|---|---|---|---|
| 991,392 | 5/1911 | Thompson | 285—24 |
| 1,680,831 | 8/1928 | White | 137—615 |
| 1,685,927 | 10/1928 | Miller | 141—388 X |
| 2,588,842 | 3/1952 | Hutt. | |
| 2,648,201 | 8/1953 | Marancik | 137—236 X |
| 2,818,891 | 1/1958 | Loeser | 141—388 |
| 2,914,080 | 11/1959 | Silveston | 137—236 |
| 2,980,150 | 4/1961 | Bily | 137—615 X |
| 3,032,082 | 5/1962 | Vilain | 137—615 X |
| 3,047,016 | 7/1962 | Andresen | 137—615 |
| 3,096,999 | 7/1963 | Ahlstone | 285—24 |

FOREIGN PATENTS 448,200  6/1936  Great Britain.

MARTIN P. SCHWADRON, *Primary Examiner.*

WILLIAM F. O'DEA, *Examiner.*

J. O'NEILL, *Assistant Examiner.*